US008458208B2

(12) United States Patent
Vyvyan (10) Patent No.: US 8,458,208 B2
(45) Date of Patent: Jun. 4, 2013

(54) AUTOMATED DATA SOURCE ASSURANCE IN DISTRIBUTED DATABASES (75) Inventor: David R. Vyvyan, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 12/248,109

(22) Filed: Oct. 9, 2008

(65) Prior Publication Data

US 2010/0094902 A1    Apr. 15, 2010

(51) Int. Cl.
G06F 7/00 (2006.01)
G06F 17/00 (2006.01)

(52) U.S. Cl.
USPC .............................. 707/769; 707/781; 707/783

(58) Field of Classification Search
USPC .......................................... 707/769, 781, 783
See application file for complete search history.

(56) References Cited

U.S. PATENT DOCUMENTS

| 5,201,046 A | 4/1993 | Goldberg et al. |
|---|---|---|
| 5,295,256 A | 3/1994 | Bapat |
| 5,408,652 A | 4/1995 | Hayashi et al. |
| 5,418,950 A | 5/1995 | Li et al. |
| 5,701,453 A | 12/1997 | Maloney et al. |
| 5,794,229 A | 8/1998 | French et al. |
| 5,873,088 A | 2/1999 | Hayashi et al. |
| 5,937,402 A | 8/1999 | Pandit |
| 6,016,497 A | 1/2000 | Suver |
| 6,175,837 B1 | 1/2001 | Sharma et al. |
| 6,226,788 B1 | 5/2001 | Schoening et al. |
| 6,457,007 B1 | 9/2002 | Kikuchi et al. |
| 6,694,306 B1 | 2/2004 | Nishizawa et al. |
| 6,708,186 B1 | 3/2004 | Claborn et al. |
| 6,950,823 B2 | 9/2005 | Amiri et al. |
| 7,251,653 B2 | 7/2007 | Huang et al. |
| 7,403,956 B2 | 7/2008 | Vaschillo et al. |
| 7,664,758 B1 | 2/2010 | Urano et al. |
| 7,752,213 B2 | 7/2010 | Todd |
| 7,921,131 B2 | 4/2011 | Uppala |
| 7,974,961 B2 | 7/2011 | Barbarek |
| 8,051,213 B2 | 11/2011 | Van Hensbergen et al. |
| 2004/0044727 A1 | 3/2004 | Abdelaziz et al. |
| 2005/0065925 A1 | 3/2005 | Weissman et al. |

(Continued)

OTHER PUBLICATIONS

United States Patent and Trademark Office, Office Action for U.S. Appl. No. 12/248,082, Jan. 4, 2011, pp. 1-19, Alexandria, VA, USA.

(Continued)

*Primary Examiner* — Vincent Boccio
(74) *Attorney, Agent, or Firm* — Lee Law, PLLC; Christopher B. Lee (57) ABSTRACT

A database query is received including a logical table identifier, a data element, and at least one data source assurance indicator at a distributed database node within a distributed network of databases. The data element is encrypted based upon the at least one data source assurance indicator. A data portion of a local query response to the database query is formed including data retrieved from a local physical database table mapped by a local logical table that matches the received logical table identifier. A node identifier and the encrypted data element are added as an authentication portion of the local query response to authenticate the data portion of the local query response. The database query is responded to with at least the authenticated local query response. This abstract is not to be considered limiting, since other embodiments may deviate from the features described in this abstract.

21 Claims, 5 Drawing Sheets

U.S. PATENT DOCUMENTS

| | | | |
|---|---|---|---|
| 2005/0096124 A1* | 5/2005 | Stronach | 463/25 |
| 2005/0138073 A1 | 6/2005 | Zhou et al. | |
| 2005/0182758 A1 | 8/2005 | Seitz et al. | |
| 2005/0223022 A1 | 10/2005 | Weissman et al. | |
| 2005/0246338 A1 | 11/2005 | Bird | |
| 2006/0004750 A1 | 1/2006 | Huang et al. | |
| 2006/0053112 A1* | 3/2006 | Chitkara et al. | 707/9 |
| 2006/0136363 A1 | 6/2006 | Nguyen et al. | |
| 2006/0136469 A1 | 6/2006 | Dettinger et al. | |
| 2006/0225072 A1 | 10/2006 | Lari et al. | |
| 2006/0294065 A1 | 12/2006 | Dettinger | |
| 2007/0002869 A1 | 1/2007 | Miller | |
| 2007/0143369 A1 | 6/2007 | Uppala | |
| 2009/0063453 A1 | 3/2009 | Adler et al. | |
| 2009/0063524 A1 | 3/2009 | Adler et al. | |
| 2009/0193006 A1 | 7/2009 | Herrnstadt | |

OTHER PUBLICATIONS

United States Patent and Trademark Office, Office Action for U.S. Appl. No. 12/248,082, Apr. 27, 2011, pp. 1-22, Alexandria, VA, USA.

United States Patent and Trademark Office, Office Action for U.S. Appl. No. 12/248,140, Apr. 13, 2011, pp. 1-15, Alexandria, VA, USA.

United States Patent and Trademark Office, Office Action for U.S. Appl. No. 12/248,170, Mar. 17, 2011, pp. 1-12, Alexandria, VA, USA.

United States Patent and Trademark Office, Office Action for U.S. Appl. No. 12/248,241, May 13, 2011, pp. 1-28, Alexandria, VA, USA.

United States Patent and Trademark Office, Office Action for U.S. Appl. No. 12/248,304, Apr. 1, 2011, pp. 1-19, Alexandria, VA, USA.

United States Patent and Trademark Office, Office Action for U.S. Appl. No. 12/248,140, Oct. 13, 2011, pp. 1-18, Alexandria, VA, USA.

United States Patent and Trademark Office, Office Action for U.S. Appl. No. 12/248,170, Sep. 30, 2011, pp. 1-18, Alexandria, VA, USA.

United States Patent and Trademark Office, Office Action for U.S. Appl. No. 12/248,241, Nov. 9, 2011, pp. 1-33, Alexandria, VA, USA.

United States Patent and Trademark Office, Office Action for U.S. Appl. No. 12/248,304, Sep. 19, 2011, pp. 1-25, Alexandria, VA, USA.

Boon-Chong Seet, et al., Route discovery optimization for dynamic source routing in mobile ad hoc networks, Article, Sep. 15, 2000, pp. 1-7, School of Computer Engineering, Nanyang Technological University, Singapore.

United States Patent and Trademark Office, Notice of Allowance for U.S. Appl. No. 12/248,082, Nov. 30, 2011, pp. 1-14, Alexandria, VA, USA.

Roy Morien, Agile Development of the Database: A Focal Entity Prototyping Approach, Proceedings of the Agile Development Conference (ADC '05), 2005, pp. 103-110 (1-8), IEEE Computer Society, Published on the World Wide Web.

Joseph Sack, SQL Server 2008 Transact-SQL Recipes: Chapter 4—Tables, Book, Jul. 25, 2008, pp. 143-195, Springer-Verlag New York, Inc., New York, NY, USA.

United States Patent and Trademark Office, Notice of Allowance for U.S. Appl. No. 12/248,241, Nov. 14, 2012, pp. 1-31, Alexandria, VA, USA.

United States Patent and Trademark Office, Office Action for U.S. Appl. No. 13/364,728, Nov. 8, 2012, pp. 1-31, Alexandria, VA, USA.

United States Patent and Trademark Office, Office Action for U.S. Appl. No. 12/248,304, Jun. 19, 2012, pp. 1-21, Alexandria, VA, USA.

United States Patent and Trademark Office, Office Action for U.S. Appl. No. 13/364,728, Jun. 12, 2012, pp. 1-34, Alexandria, VA, USA.

United States Patent and Trademark Office, Notice of Allowance for U.S. Appl. No. 12/248,140, Jun. 21, 2012, pp. 1-30, Alexandria, VA, USA.

United States Patent and Trademark Office, Office Action for U.S. Appl. No. 12/248,241, Apr. 26, 2012, pp. 1-53, Alexandria, VA, USA.

United States Patent and Trademark Office, Notice of Allowance for U.S. Appl. No. 12/248,170, May 24, 2012, pp. 1-24, Alexandria, VA, USA.

United States Patent and Trademark Office, Notice of Allowance for U.S. Appl. No. 12/248,304, Jan. 17, 2013, pp. 1-17, Alexandria, VA, USA.

United States Patent and Trademark Office, Office Action for U.S. Appl. No. 13/561,659, Feb. 15, 2013, pp. 1-34, Alexandria, VA, USA.

* cited by examiner

AUTOMATED DATA SOURCE ASSURANCE IN DISTRIBUTED DATABASES

This invention was made with Government support under W911NF-06-3-0001 awarded by United States Army. The Government has certain rights to this invention.

RELATED APPLICATIONS

This application is related to the application titled "AUTOMATED PROPAGATION OF NON-CONFLICTING QUERIES IN DISTRIBUTED DATABASES," filed contemporaneously herewith on Oct. 9, 2008, and assigned application Ser. No. 12/248,082, to the application titled "AUTOMATED QUERY PATH REPORTING IN DISTRIBUTED DATABASES," filed contemporaneously herewith on Oct. 9, 2008, and assigned application Ser. No. 12/248,170, to the application titled "AUTOMATED DATA CONVERSION AND ROUTE TRACKING IN DISTRIBUTED DATABASES," filed contemporaneously herewith on Oct. 9, 2008, and assigned application Ser. No. 12/248,140, to the application titled "DYNAMIC CONTEXT DEFINITIONS IN DISTRIBUTED DATABASES," filed contemporaneously herewith on Oct. 9, 2008, and assigned application Ser. No. 12/248,241, and to the application titled "NODE-LEVEL SUB-QUERIES IN DISTRIBUTED DATABASES," filed contemporaneously herewith on Oct. 9, 2008, and assigned application Ser. No. 12/248,304, each of which is hereby incorporated by reference as if fully set forth herein.

This application is also related to the application titled "AN APPARATUS FOR PROPAGATING A QUERY," filed in the United Kingdom on Sep. 19, 2007, with application serial number 0718251.2, the application titled "AN APPARATUS FOR STORING A LOGICAL STATEMENT," filed in the United Kingdom on Sep. 19, 2007, with application serial number 0718214.0, and the application titled "AN APPARATUS FOR ENABLING CONNECTIONS," filed in the United Kingdom on Sep. 19, 2007, with application serial number 0718248.8 and filed within the United States on Apr. 11, 2008, with application Ser. No. 12/101,220, each of which is hereby incorporated by reference as if fully set forth herein.

BACKGROUND OF THE INVENTION

1. Field of the Invention

The present invention relates to systems and methods for verifying query data sources in ad-hoc distributed database systems. More particularly, the present invention relates to automated data source assurance in distributed databases.

2. Related Art

Distributed databases include multiple databases accessible via a network or other interconnection by a querying computing node. The distributed databases may be logically distributed across multiple access or network domains and may be geographically distributed across physical locations. The querying computing node often uses a centralized registry to identify databases and physical data structures within the identified databases. The physical data structures are identified and accessible globally by name. Queries are issued to an identified database using an identified global name of a physical data structure. Query results are returned from the identified database in response to the issued query.

BRIEF SUMMARY OF THE INVENTION

The subject matter described herein provides automated data source assurance in ad-hoc distributed databases. For purposes of the present subject matter, "ad-hoc" encompasses systems that are fit for purposes of the present subject matter with any kind of connection strategy that may be employed. A logical data structure (e.g., table) identifier, a data source assurance indicator, and a data element (e.g., a text string, binary data segment, etc.) are transmitted in association with a distributed database query. Upon receipt of the query, a distributed database node encrypts the data element as instructed by the data source assurance indicator and retrieves data from a local physical database table mapped by a local logical table that matches the received logical table identifier. The retrieved data, the encrypted data element, and a node identifier are formed into a local authenticated query response. If the received query is forwarded to another distributed database node, the forwarding node receives a distributed query response similar to the local authenticated query response from each node that processed the database query. The forwarding node may determine authenticity of each distributed query response based upon each received encrypted data element and node identifier prior to responding to the query. The local authenticated query response and either the received authenticated or received unauthenticated query responses may be combined and returned to the originating node for processing. Using the data source assurance associated with the present subject matter, encryption processing overhead and processing time may be reduced while providing data source provenance within a distributed database system.

A method includes receiving a database query comprising a logical table identifier, a data element, and at least one data source assurance indicator at a distributed database node within a distributed network of databases, where the at least one data source assurance indicator comprises a request to encrypt the data element for authentication purposes; encrypting the data element based upon the at least one data source assurance indicator; forming a data portion of a local query response to the database query comprising data retrieved from a local physical database table mapped by a local logical table that matches the received logical table identifier; adding a node identifier and the encrypted data element as an authentication portion of the local query response to authenticate the data portion of the local query response; and responding to the database query with at least the authenticated local query response.

A system includes a memory adapted to store query authentication information and database node identifiers; and a processor programmed to: receive a database query comprising a logical table identifier, a data element, and at least one data source assurance indicator at a distributed database node within a distributed network of databases, where the at least one data source assurance indicator comprises a request to encrypt the data element for authentication purposes, encrypt the data element based upon the at least one data source assurance indicator, form a data portion of a local query response to the database query comprising data retrieved from a local physical database table mapped by a local logical table that matches the received logical table identifier, add a node identifier and the encrypted data element as an authentication portion of the local query response to authenticate the data portion of the local query response, store the authenticated local query response to the memory, and respond to the database query with at least the authenticated local query response.

An alternative system includes a memory adapted to store query authentication information and database node identifiers; and a processor programmed to: receive a database query comprising a logical table identifier, a data element, and at least one data source assurance indicator at a distributed database node within a distributed network of databases, where the at least one data source assurance indicator comprises a request to encrypt the data element for authentication purposes, encrypt the data element based upon the at least one data source assurance indicator using a private encryption key paired with a public encryption key stored at a distributed database node that originated the database query, form a data portion of a local query response to the database query comprising data retrieved from a local physical database table mapped by a local logical table that matches the received logical table identifier, add a node identifier and the encrypted data element as an authentication portion of the local query response to authenticate the data portion of the local query response, associate the node identifier and the encrypted data element with a hidden result column of the authenticated local query response, store the authenticated local query response to the memory, determine to encrypt a selected data column of the data portion of the authenticated local query response, encrypt the selected data column, add a column identifier to the authenticated local query response identifying the selected encrypted data column, and respond to the database query with at least the authenticated local query response.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL
VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated data source assurance in ad-hoc distributed databases. For purposes of the present subject matter, "ad-hoc" encompasses systems that are fit for purposes of the present subject matter with any kind of connection strategy that may be employed. A logical data structure (e.g., table) identifier, a data source assurance indicator, and a data element (e.g., a text string, binary data segment, etc.) are transmitted in association with a distributed database query. Upon receipt of the query, a distributed database node encrypts the data element as instructed by the data source assurance indicator and retrieves data from a local physical database table mapped by a local logical table that matches the received logical table identifier. The retrieved data, the encrypted data element, and a node identifier are formed into a local authenticated query response. If the received query is forwarded to another distributed database node, the forwarding node receives a distributed query response similar to the local authenticated query response from each node that processed the database query. The forwarding node may determine authenticity of each distributed query response based upon each received encrypted data element and node identifier prior to responding to the query. The local authenticated query response and either the received authenticated or received unauthenticated query responses may be combined and returned to the originating node for processing. Using the data source assurance associated with the present subject matter, encryption processing overhead and processing time may be reduced while providing data source provenance within a distributed database system.

The automated data source assurance in distributed databases described herein may be performed in real time to allow prompt assurance of authenticity of a distributed database node that responds to a query. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art.

Figure 1:
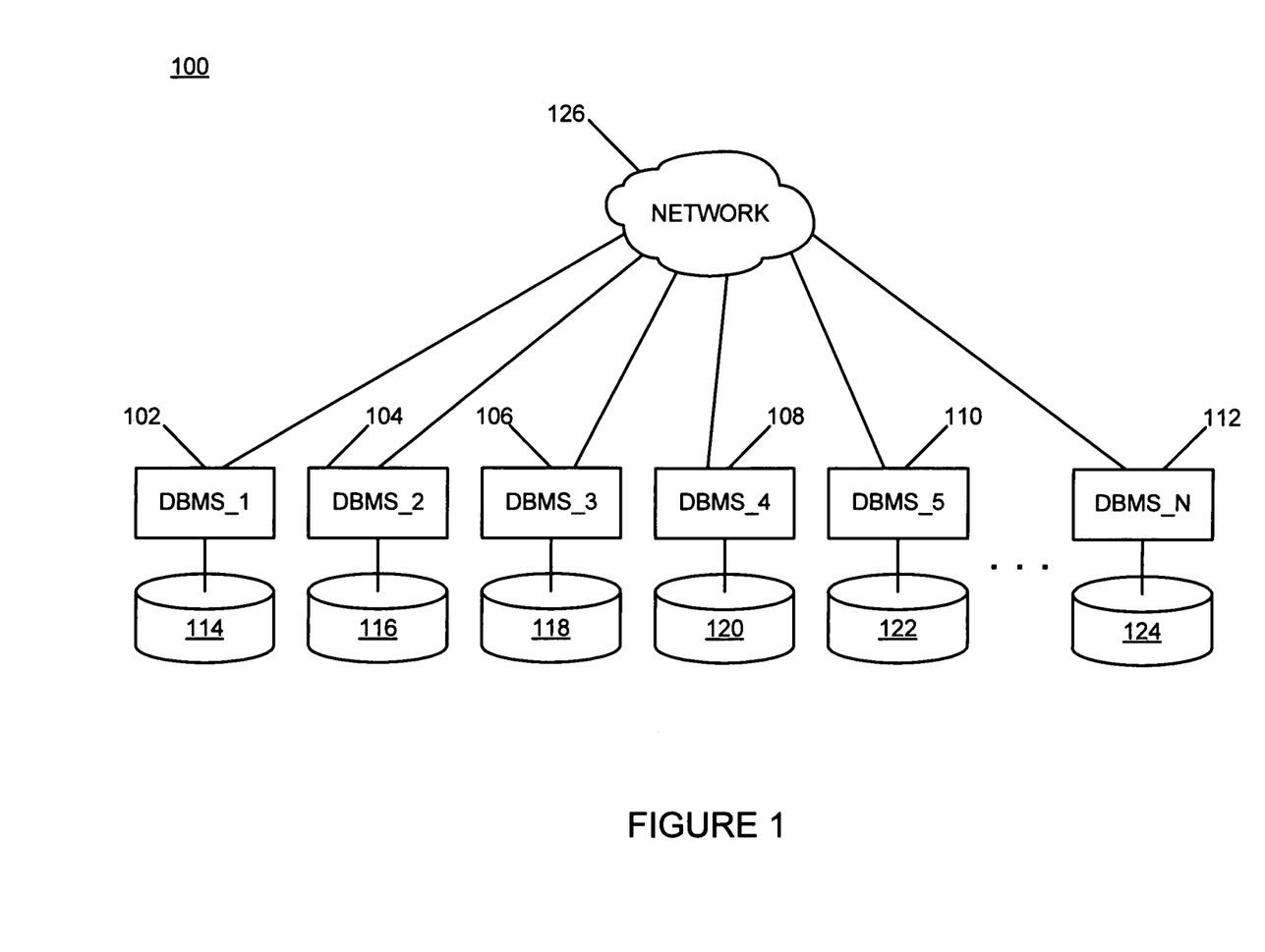
FIG. 1 is a block diagram of an example of an implementation of a system for automated data source assurance in distributed databases according to an embodiment of the present subject matter.

FIG. 1 is a block diagram of an example of an implementation of a system 100 for automated data source assurance in distributed databases. Within the system 100, a database management system_1 (DBMS_1) 102, a DBMS_2 104, a DBMS_3 106, a DBMS_4 108, a DBMS_5 110, up to a DBMS_N 112 are illustrated. The DBMS_1 102 through the DBMS_N 112 are each associated with a database 114, a database 116, a database 118, a database 120, a database 122, up to a database 124, respectively. The DBMS_1 102 through the DBMS_N 112 are interconnected via a network 126.

For purposes of the present description, it should be noted that while the network 126 is illustrated as interconnecting the DBMS_1 102 through the DBMS_N 112 with each other, this should not be considered limiting. The network 126 may be formed by any interconnection appropriate for use in a distributed database environment. For example, the network 126 may include any form of interconnection suitable for the intended purpose, including a private or public network such as an intranet or the Internet, respectively, direct inter-module interconnection, dial-up, or any other interconnection mechanism capable of interconnecting the devices with the system 100.

As such, any two or more of the DBMS_1 102 through the DBMS_N 112 may be interconnected by proximity, interconnection, or routing capabilities within the system 100, while certain other of the devices may not have interconnectivity other than via other distributed database devices. Accordingly, certain of the DBMS_1 102 through the DBMS_N 112 may not be capable of communication with one another other than via the other distributed database devices.

As will be described in more detail below in association with FIGS. 2 through 6 below, the DBMS_1 102 through the DBMS_N 112 provide automated data source assurance within the system 100. The automated data source assurance in distributed databases is based upon propagation of a data source assurance indicator and an associated data element in association with database queries.

It should be noted that the DBMS_1 102 through the DBMS_N 112 may be any type of device configurable for storage of information and distributed interconnectivity for database-style queries. For example, the DBMS_1 102 through the DBMS_N 112 may include devices such as a personal computer (e.g., desktop, laptop, palm, etc.) or a handheld device (e.g., cellular telephone, personal digital assistant (PDA), email device, music recording or playback device, etc.), or any other device capable of processing information as described above and in more detail below.

Figure 2:
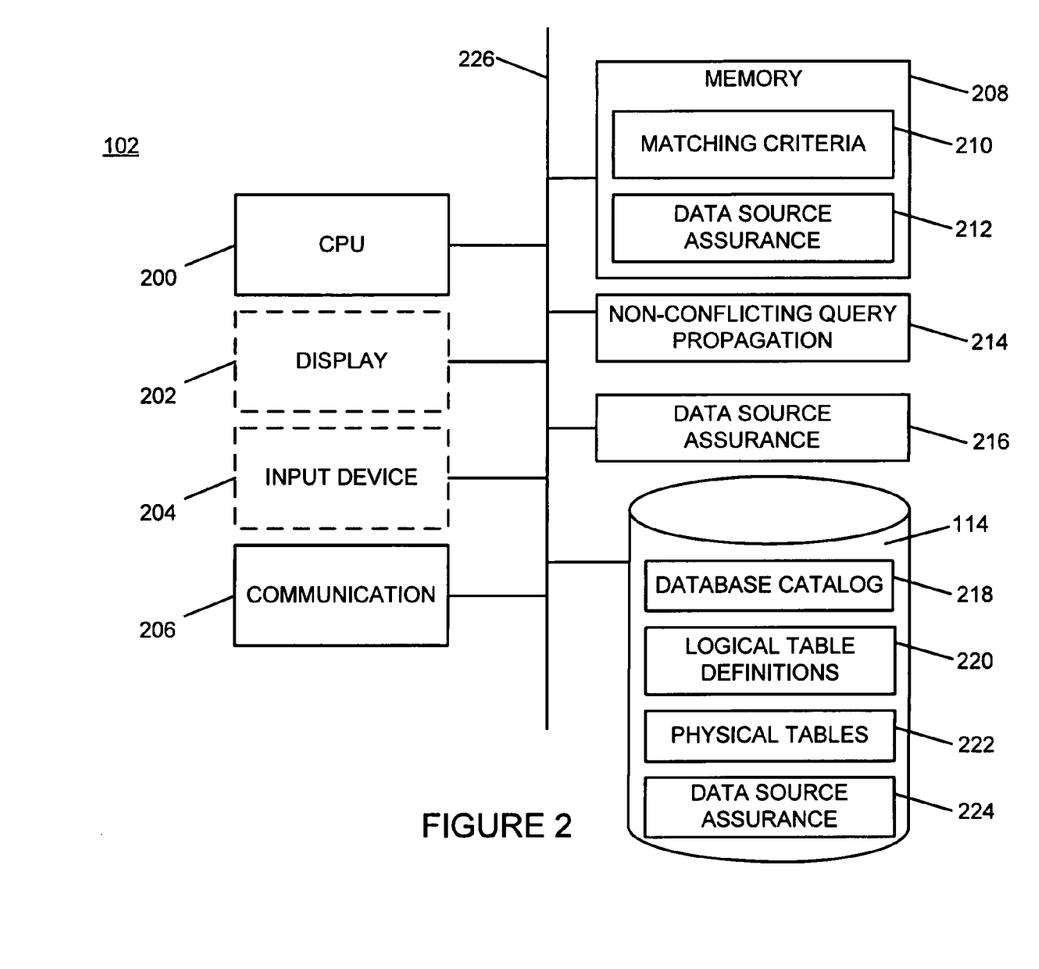
FIG. 2 is a block diagram of an example of an implementation of a database management system that is capable of performing automated data source assurance based upon propagation of a data source assurance indicator and an associated data element in association with a database query within a distributed database system according to an embodiment of the present subject matter.

FIG. 2 is a block diagram of an example of an implementation of the DBMS_1 102 that is capable of performing automated data source assurance based upon propagation of a data source assurance indicator and an associated data element in association with a database query within a distributed database system, such as the system 100. A central processing unit (CPU) 200 provides computer instruction execution, computation, and other capabilities within the DBMS_1 102. A display 202 provides visual information to a user of the DBMS_1 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they are not required components for the DBMS_1 102. Accordingly, the DBMS_1 102 may operate as a completely automated embedded device without user configurability or feedback. However, the DBMS_1 102 may also provide user feedback and configurability via the display 202 and the input device 204, respectively.

A communication module 206 provides interconnection capabilities that allow the DBMS_1 102 to communicate with other modules within the system 100, such as the DBMS_2 104 through the DBMS_N 112, to perform data source assurance within the system 100. The communication module 206 may include any electrical, protocol, and protocol conversion capabilities useable to provide the interconnection capabilities.

A memory 208 includes a matching criteria storage area 210 that stores information usable to identify processing preferences or priorities for non-conflicting queries within the system 100. The matching criteria stored within the matching criteria storage area 210 are used to configure and control query data selection and processing, query forwarding, and query responses. The memory 208 also includes a data source assurance information storage area 212 that stores data source assurance information usable to determine authenticity of query responses within the system 100. As will be described in more detail below, the data source assurance information stored within the data source assurance information storage area 212 is used to store node identifiers, public and/or private encryption key pairs, encrypted and non-encrypted data elements (e.g., text strings, binary data segments, etc.), and may store authenticated query responses to facilitate data source assurance within the system 100. The data source assurance information may also be used to identify nodes that have access to the system 100 that are not authenticated and data associated with unauthenticated nodes may be discarded.

A non-conflicting query propagation module 214 is illustrated. The non-conflicting query propagation module 214 provides query processing, query forwarding, and query response capabilities for the DBMS_1 102. A data source assurance module 216 is also illustrated. The data source assurance module 216 provides the data source assurance and node authentication capabilities for distributed database devices, such as the DBMS_1 102, as described above and in more detail below.

Though the communication module 206, the non-conflicting query propagation module 214, and the data source assurance module 216 are illustrated as component-level modules for ease of illustration and description purposes, it should be noted that these modules include any hardware, programmed processor(s), and memory used to carry out the respective functions of the modules as described above and in more detail below. For example, the communication module 206, the non-conflicting query propagation module 214, and the data source assurance module 216 may include additional controller circuitry in the form of application specific integrated circuits (ASICs), processors, antennas, and/or discrete integrated circuits and components for performing communication and electrical control activities associated with the respective modules. Additionally, the communication module 206, the non-conflicting query propagation module 214, and the data source assurance module 216 also include interrupt-level, stack-level, and application-level modules as appropriate. Furthermore, these modules include any memory components used for storage, execution, and data processing for performing processing activities associated with the respective modules. The communication module 206, the non-conflicting query propagation module 214, and the data source assurance module 216 may also form a portion of other circuitry described without departure from the scope of the present subject matter.

The database 114 provides storage capabilities for information associated with the automated propagation of non-conflicting queries and data source assurance capabilities of the DBMS_1 102. The database 114 includes a database catalog storage area 218, a logical table definition storage area 220, a physical table storage area 222, and a data source assurance storage area 224 that may be stored in the form of tables or other arrangements accessible by the DBMS_1 102.

The database catalog storage area 218 stores information associated with logical tables stored at other database management systems, such as the DBMS_2 104 through the DBMS_N 112, within the system 100. The information stored within the database catalog storage area 218 may be compiled in response to queries of other database nodes within the system 100 for logical table definitions stored at those other nodes. As such, the DMBS_1 102 may determine and store logical table definitions for other nodes within the system 100 for use during query processing.

The logical table definition storage area 220 stores information about logical tables stored locally to the DBMS_1 102. The logical tables map to physical data and physical tables stored within the physical table storage area 222. The physical table storage area 222 stores physical tables that may or may not be federated within a distributed database system, such as the system 100, based upon mappings defined within the respective logical table definition storage area 220.

The data source assurance storage area 224 stores information associated with the received distributed database responses for distributed database queries as identified by the data source assurance module 216. As will be described in more detail below beginning with FIG. 3, logical table identifiers are associated with database queries. Upon receipt of a database query, the receiving distributed database node, such as the DBMS_1 102, determines whether a data source assurance indicator and data element were received with the query in association with the logical table identifier received with the query. The data source assurance indicator may be, for example, an instruction requesting the receiving node to encrypt the received data element and to append the encrypted data element and its node identifier to a query response to authenticate the query response. The DBMS_1 102 forms an authenticated local query response including a data portion and an authentication portion. If the DBMS_1 102 forwards the query to an additional distributed database node, the DBMS_1 102 may authenticated any received query responses and combine authenticated and/or unauthenticated received query responses with the authenticated local query response. The combined query response or the authenticated local query response may be returned to the originating node for processing.

The originating node or any intermediate node may process received and locally-created authenticated query responses for data source assurance purposes. Any received or authenticated query responses may be stored within the data source assurance storage area 224 and may be forwarded to other distributed database nodes to distribute authenticated query responses.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

The CPU 200, the display 202, the input device 204, the communication module 206, the memory 208, the non-conflicting query propagation module 214, the data source assurance module 216, and the database 114 are interconnected via an interconnection 226. The interconnection 226 may include a system bus, a network, or any other interconnection capable of providing the respective components with suitable interconnection for the respective purpose.

While the DBMS_1 102 is illustrated with and has certain components described, other modules and components may be associated with the DBMS_1 102 without departure from the scope of the present subject matter. Additionally, it should be noted that, while the DBMS_1 102 is described as a single device for ease of illustration purposes, the components within the DBMS_1 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the DBMS_1 102 are possible and all are considered within the scope of the present subject matter. It should also be understood that, though the database catalog storage area 218, the logical table definition storage area 220, the physical table storage area 222, and the data source assurance storage area 224 are shown within the database 114, they may also be stored within the memory 208 without departure from the scope of the present subject matter. Accordingly, the DBMS_1 102 may take many forms and may be associated with many platforms.

Based upon the description above, data source assurance in the context of query processing will now be described. It is understood that any of the DBMS_1 102 through the DBMS_N 112 may originate a query for purposes of the following examples. An originated query may be propagated to one or more of the distributed database nodes from each node as the query progresses through the system 100. Responses to the query are propagated to the originating node for processing and/or may be processed by each node on the return path for validation purposes. Accordingly, many possibilities exist for data source assurance processing and all are considered within the scope of the present subject matter.

Regarding an example query format that may be used for data source assurance, the following example Query 1 represents a pseudo-query format for one possible implementation of a data source assurance query.

select a from logical table 'LT1' 'ValidateSourceBySigning <RandomString>' as LT1 (Query 1)

As can be seen from the pseudo-query format for the example Query 1, a query is formed using a "select" query identifier. The character following the select query identifier represents a column name for the associated logical table. As such, the Query 1 is a column name-based query. Within the present example, the Query 1 requests data associated with a column named "a." The Query 1 instructs receiving distributed database nodes to use logical table definitions for fulfillment of the Query 1 with the phrase "from logical table." The requested logical table identifier is shown within single quotation marks. As such, the Query 1 requests data associated with a logical table named "LT1." The second reference to "LT1" within the Query 1 is an alias to a composite name for the logical table, again listed as "LT1" within the present example.

Regarding data source assurance, the example Query1 includes data source assurance information within single quotation marks. The phrase "ValidateSourceBySigning" represents an example data source assurance indicator that instructs receiving distributed database nodes to sign the query response generated by the nodes to authenticate the respective responses. As described above and in more detail below, the data source assurance indicator is associated with a data element (e.g., "RandomString" within the present example) within angle brackets within the present example and the distributed database nodes encrypt the data element with a private encryption key of a key pair associated with each distributed database node to authenticate the respective query responses. It is assumed for purposes of the present subject matter that appropriate generation and distribution of public and private key pairs associated with each authentic distributed database node has been performed in any suitable fashion.

As described above, the data source assurance associated with the present subject matter allows encryption processing overhead and processing time to be reduced while providing data source provenance within a distributed database system, such as the system 100. As such, using a query format such as the pseudo-query format of the example Query 1, a data source assurance indicator may be distributed with a data element and a logical table identifier. The logical table identifier may be used by distributed database nodes to process and generate a data portion of a query response using a matching local logical table defined at the distributed database nodes that map to one or more physical data tables. Using the logical table database query format for the data portion of a query, certain data within a physical database tables may be federated while other data may be maintained privately within the respective physical database tables. The data source assurance indicator instructs database nodes that process and respond the query to encrypt the received data element using a private encryption key and to associate the resulting encrypted data element with an authentication portion of the database response.

As another example, the data source assurance indicator may also instruct database nodes that process and respond the query to encrypt a portion of the data portion of the generated query response. The following example Query2 represents a pseudo-query format for one possible implementation of a data source assurance query that further instructs distributed database nodes that process the Query2 to encrypt a portion of the data results returned.

select a from logical table 'LT1' 'ValidateSourceBySigning <RandomString, COL1>' as LT1 (Query2)

As can be seen from the example Query2, a column identifier (e.g., "COL1") has been included within the data source assurance indicator. Otherwise, the example Query2 is identical to the example Query1. The column identifier represents a selected column, column one (1) within the present example, of the data portion of the generated query response to encrypt. As such, the data source assurance allows encryption processing overhead and processing time to be reduced while providing data source provenance within the system 100 in a flexible fashion.

It should be noted, that while the present example Query2 includes an instruction to encrypt a certain column of the data portion of the query results returned from each distributed database node that processes the example Query2, as an alternative, nodes that process a query may make a determination to encrypt certain columns of data without being instructed to do so. Furthermore, while the present example uses the column identifier "COL1," a query may substitute that column identifier with a column name as requested after the "select" query identifier (e.g., "a" within the present example) without departure from the scope of the present subject matter.

It should also be noted that additional instructions may be distributed in association with a data source assurance query. For example, an instruction directing each node that receives a query response in association with forwarding of the query to perform authentication procedures may be distributed in the manner described above in association with a data source assurance query. Additionally, an instruction directing nodes to invalidate the data returned from any distributed database node that is not authenticated may also may be distributed in the manner described above in association with a data source assurance query. Many other possibilities exist for distribution of data source assurance indicators and instructions based upon the present subject matter. Accordingly, all such possibilities are considered within the scope of the present subject matter.

It should be noted that for purposes of the present description, a virtual table interface may be formed based upon the logical table definitions. The virtual table interface may be defined as a set of interfaces for representation of physical data for encapsulation and abstraction of the physical data within a distributed network of databases, such as the system 100. Class definitions may be constructed for creation and representation of the logical table definitions. For example, a class for a query may be defined in a syntactic representation, such as Java, to accept logical table name as an argument of a class constructor. A logical table definition may also be passed as a second argument to the class constructor. Upon instantiation, a query object may be created with the logical table name and definition associated with the query object. Distributed database nodes may make calls into the query object for logical table information and processing.

It should be noted that though the example Query1 and Query2 do not include communicated matching criteria, it is understood that the queries may be modified to include matching criteria without departure from the scope of the present subject matter. Further, as described above, matching criteria may be either communicated with the queries or may be stored locally in advance of issuance of a query. As such, default matching criteria may be established and stored within the matching criteria storage area 210 of the memory 208 at each distributed database node. For example, default matching may be strict matching for column name, column position within a logical table, column name data type, column name data precision, and other factors. Issued queries may modify default matching criteria to pass additional or alternative matching criteria instructing the receiving distributed database nodes to match based upon the additional matching criteria or to change default matching criteria. For example, additional or alternative matching criteria include matching a column name in any position of a logical table, matching data precision based upon equal or greater precision within the respective logical table definitions, and other matching criteria. There are many other possible matching criteria that may be used, and all are considered within the scope of the present subject matter.

Regarding an example query response format that may be used for data source assurance, the following example Table 1 represents a pseudo-query response format for one possible implementation of a data source assurance query response returned in response to the example Query1 above.

TABLE 1

Example Query Response for Query1

| Row # | a | Node Identifier (hidden column) | Node Signature (hidden column) |
|---|---|---|---|
| Row1 | ClientName1 | IPAddress1 | <BINARY1> |
| Row2 | ClientName2 | IPAddress2 | <BINARY2> |

Within the present example pseudo-query response, it is assumed that the Row1 and the Row2 were returned by two distributed database nodes and that the "Row #" column does not form a portion of the actual query response, but is represented to ease the description of the rows that form the response. The column "a" represents a data portion of the example pseudo-query response returned by each node. As described above, data columns may also be encrypted, but for purposes of the present example, it is assumed that the data within the data portion of the example pseudo-query response is not encrypted. The "Node Identifier" column represents a hidden column within the present example that includes a node identifier for each node that returned query results. For purposes of the present example, an Internet protocol (IP) address is assumed to be returned as a node identifier. The "Node Signature" column represents a second hidden column that includes an encrypted data element designated by the identifiers <BINARY1> and <BINARY2> within the present example.

For purposes of the present subject matter, the column "a" represents the data portion of the query response and the two hidden columns "Node Identifier" and "Node Signature" represent the authentication portion of the query response. The hidden columns may be removed for application-level processing purposes after authentication procedures are performed on the returned query responses. The following example processes describe more detail associated with the data source assurance of the present subject matter.

Figure 3:
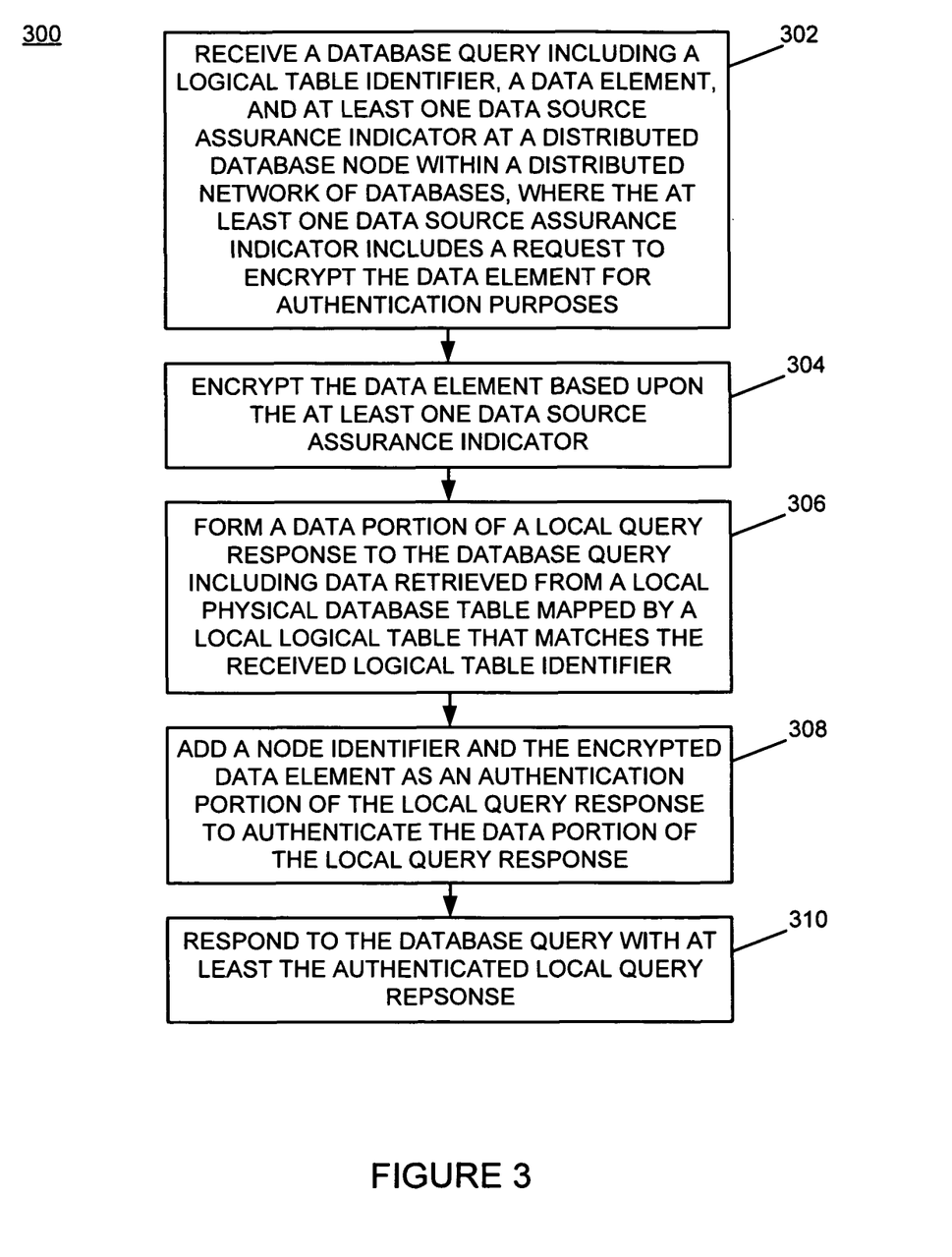
FIG. 3 is a flow chart of an example of an implementation of a process for automated data source assurance in distributed databases according to an embodiment of the present subject matter.
Figure 4A:
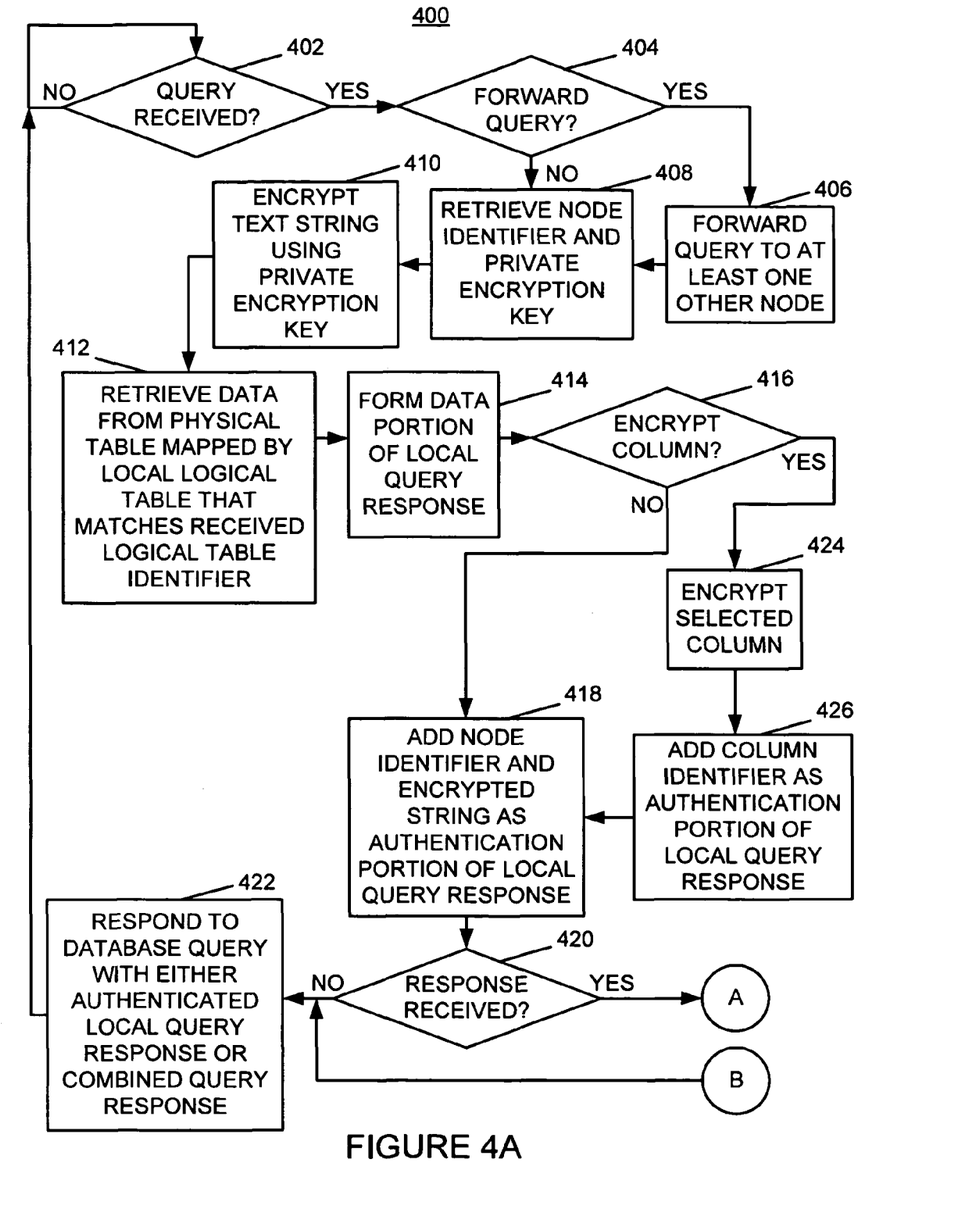
FIG. 4A is a first portion of a flow chart of an example of an implementation of a process that illustrates initial processing for automated data source assurance in distributed databases based upon processing of a data source assurance indicator and an associated data element for authentication of a local query response and received query responses according to an embodiment of the present subject matter.
Figure 4B:
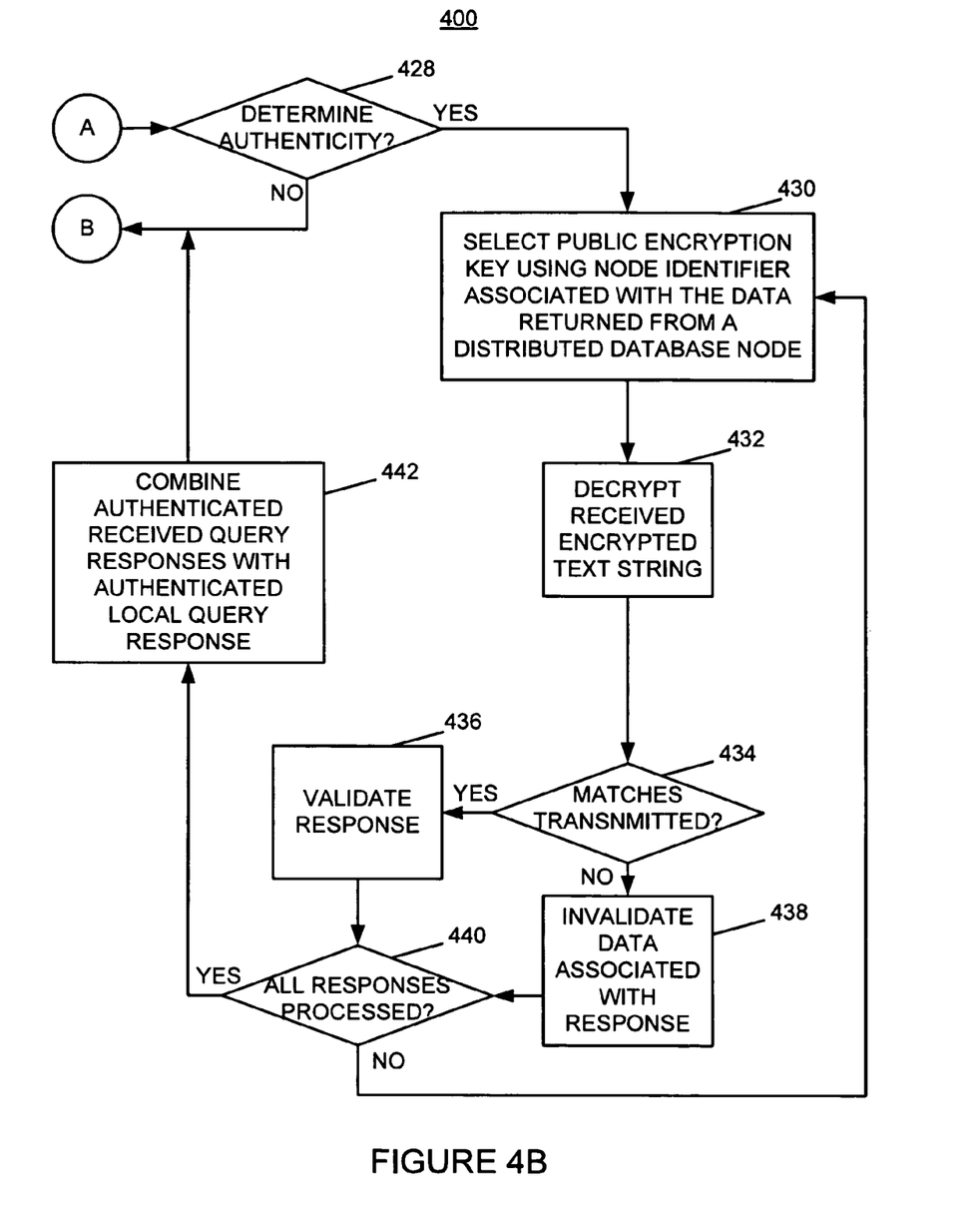
FIG. 4B is a second portion of a flow chart of an example of an implementation of a process that illustrates additional processing for automated data source assurance in distributed databases based upon processing of a data source assurance indicator and an associated data element for authentication of a local query response and received query responses according to an embodiment of the present subject matter.

FIGS. 3 through 4B below describe example processes that may be executed by distributed database devices, such as the DBMS_1 102 through the DBMS_N 112, to perform the automated data source assurance associated with the present subject matter. The example processes may be performed by modules, such as the data source assurance module 216 and/or the CPU 200, associated with distributed database devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated data source assurance in distributed databases according to an embodiment of the present subject matter. At block 302, the process 300 receives a database query including a logical table identifier, a data element, and at least one data source assurance indicator at a distributed database node within a distributed network of databases, where the at least one data source assurance indicator includes a request to encrypt the data element for authentication purposes. At block 304, the process 300 encrypts the data element based upon the at least one data source assurance indicator. At block 306, the process 300 forms a data portion of a local query response to the database query including data retrieved from a local physical database table mapped by a local logical table that matches the received logical table identifier. At block 308, the process 300 adds a node identifier and the encrypted data element as an authentication portion of the local query response to authenticate the data portion of the local query response. At block 310, the process 300 responds to the database query with at least the authenticated local query response.

FIGS. 4A-4B illustrate a flow chart of an example of an implementation of a process 400 for automated data source assurance in distributed databases based upon processing of a data source assurance indicator and an associated data element for authentication of a local query response and received query responses. For purposes of the present example, the data element is represented as a text string. FIG. 4A illustrates initial processing associated with the process 400. At decision point 402, the process 400 determines whether a query has been received. As described above, a query is associated with and includes a logical table identifier, a text string, and at least one data source assurance indicator. The data source assurance indicator may include an instruction for nodes that receive and process the query regarding data source assurance measures that the nodes are to perform and return with a query response. For example, as described above, a data source assurance indicator may instruct distributed database nodes that process the query to encrypt the text string. Additionally, a data source assurance indicator may also instruct processing nodes to encrypt other portions of the response data without encryption of the entire response. Accordingly, using the data source assurance of the present subject, encryption processing overhead and processing time may be reduced while providing data source provenance within a distributed database system, such as the system 100.

When a determination is made at decision point 402 that a query has been received, the process 400 makes a determination at decision point 404 as to whether to forward the query to at least one other node within the distributed network of databases. As described above, nodes may be interconnected such that each node has one or more interconnected nodes to which it may forward a received query. As such, each node that receives a query may make this determination to forward the received query based upon such interconnection and knowledge of whether the query has been received from the one or more interconnected nodes previously. For ease of illustration purposes, this additional processing is not shown within FIG. 4A.

When a determination is made at decision point 404 to forward the received query, the process 400 forwards the received query including the received logical table identifier, text string, and at least one data source assurance indicator to at least one other node at block 406. When the process 400 makes determination not to forward the received query or when the received query has been forwarded, the process 400 retrieves a local node identifier and private encryption key from a memory, such as the data source assurance information storage area 212 of the memory 208, at block 408. At block 410, the process 400 encrypts the received text string using the private encryption key.

At block 412, the process 400 retrieves data requested by the received query from a physical table that is mapped by a local logical table that matches the received logical table identifier. The physical table may be located within the physical table storage area 222 and mapped by a logical table stored within the logical table storage area 220 of the respective database of the node that is executing the process 400. For purposes of the present example, it is assumed that there is a local logical table that matches the received logical table identifier. It is also understood that logical table matching activities may be added to the process 400 without departure from the scope of the present subject matter and that this additional processing is not shown within FIG. 4A for ease of illustration purposes.

At block 414, the process 400 forms a data portion of a local query response using the data retrieved from physical storage. At decision point 416, the process 400 makes a determination as to whether to further authenticate the local query response by encrypting an additional column or portion of the data portion of the local query response. As described above, one or more columns of the local data response may be encrypted to further authenticate the local query response. Additionally, selected other portions of data within the query response may also be encrypted to further authenticate the local query response.

Accordingly, as described above, the process 400 may make the determination to further authenticate the local query response by encrypting a column or portion of the data portion of the local query response at decision point 416 based upon an additional received data source assurance indicator. Additionally, the process 400 may make the determination to encrypt an additional column or portion of the data portion of the local query response based upon local configuration or other authentication criteria stored in association with the data source assurance information storage area 212.

When a determination is made not to encrypt a column or portion of the data portion of the local query response at decision point 416, the process 400 authenticates the local query response by adding the encrypted text string and the node identifier to an authentication portion of the local query response at block 418. The authentication portion of the query response may be an additional column or columns. Additionally, the additional columns may be hidden columns that are not processed by application-level processes or modules without departure from the scope of the present subject matter. Additional processing for determining whether to add the encrypted text string and the node identifier within a hidden column is not shown for ease of illustration purposes. However, it is understood than any such processing is considered within the scope of the present subject matter.

The process 400 makes a determination at decision point 420 as to whether a query response has been received in response to forwarding a query at block 406, as described above. When a determination is made that a query response has not been received, the process 400 responds to the received query with the authenticated local query response at block 422 and returns to decision point 402 to await another query.

It should be understood that query processing may be asynchronous in nature, such that a query response may or may not be received at a given point within a given process, such as the process 400. However, for purposes of the present example, it is assumed that sufficient distributed database processing and network speed are available such that the process 400 will have received a query response for a forwarded query by the time the process 400 considers the determination at decision point 420. As such, the process 400 may make the determination at decision point 420 without waiting or further processing. Additional processing for situations where distributed database processing or network speed result in additional processing requirements may be added to the process 400 without departure from the scope of the present subject matter.

It should also be understood that if the received query was forwarded to more than one other distributed database node at block 406, more than one query response may be anticipated to be returned. The example process 400 represents processing for a single query receipt, as described in more detail below. However, additional processing for more than one received query response may be added to the process 400 without departure from the scope of the present subject matter. As will be described in more detail below, based upon other processing associated with a received query response, as determined at decision point 420, the process 400 may form a combined response and respond at block 422 with the combined response.

Returning to the description of decision point 416, when a determination is made to encrypt an additional column or portion of the data portion of the local query response, the process 400 encrypts the selected column or portion of the data portion of the local query response at block 424. At block 426, the process 400 adds a column identifier as part of an authentication portion of the query response identifying the selected encrypted data column or portion of data. The process 400 continues to block 418 and continues processing as described above and in more detail below.

Returning to the description of decision point 420, when the process 400 makes a determination that a query response has been received in response to forwarding the received query to at least one other distributed database node at block 406, the process continues processing as shown and described in association with FIG. 4B. As described above, a received query response will include a node identifier and an encrypted text string associated with each node that responded to the query.

FIG. 4B illustrates additional processing associated with the process 400 for automated data sources assurance. At decision point 428, the process 400 makes a determination as to whether to process the received query response to determine authenticity of the received query response. As described above, any distributed database node may process a received query response to authenticate the query response as the response propagates through the distributed network of databases. Alternatively, processing of the query response may be performed at the originating node for all responses generated. The determination at decision point 428 may be based upon configuration at the respective nodes or may be based upon an additional instruction field within the received data source assurance indicator, as described above.

When a determination is made at decision point 428 not to process the received query response to determine authenticity of the received query response, the process 400 returns to block 422 (See FIG. 4A) to continue processing as described above. When a determination is made at decision point 428 to process the received query response to determine authenticity of the received query response, the process 400 selects a public encryption key for a first distributed database node (e.g., a first row of returned data) using an associated node identifier received with the query response from the respective node at block 430.

At block 432, the process 400 decrypts the received encrypted text string. At decision point 434, the process 400 makes a determination as to whether the decrypted text string and the forwarded text string match. When the process 400 makes a determination that the decrypted text string and the forwarded text string match, the process 400 validates the response from the respective distributed database node at block 436. When the process 400 makes a determination that the decrypted text string and the forwarded text string do not match, the process 400 invalidates the response from the respective distributed database node at block 438.

Upon completion of the respective validation or invalidation procedure at block 436 and block 438, respectively, the process 400 makes a determination as to whether all responses have been processed at decision point 440. When a determination is made that all responses have not been processed, the process 400 returns to block 430 to continue processing as described above. When a determination is made that all responses have been processed, the process 400 combines any authenticated received query responses with the authenticated local query response at block 442. The process 400 continues to block 422 (See FIG. 4A) and responds to the received query with the combined query response. The process 400 returns to decision point 402 to await another query.

As such, the process 400 provides automated data source assurance in distributed databases based upon processing of a data source assurance indicator and an associated data element for authentication of a local query response and received query responses. The process 400 may perform additional authentication measures by encrypting selected columns or portion of data associated with a data portion of a local query response. The process 400 may also process query responses received in response to forwarding a received database query to authenticate the returned responses. As such, the process 400 may be used to distribute authentication procedures within a distributed database system, such as the system 100.

As described above in association with FIGS. 1 through 4B, the example systems and processes provide automated data source assurance in distributed databases. Many other variations and additional activities associated with automated data source assurance are possible and all are considered within the scope of the present subject matter.

Those skilled in the art will recognize, upon consideration of the above teachings, that certain of the above exemplary embodiments are based upon use of a programmed processor such as CPU 200. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
   receiving a database query comprising a logical database table identifier, a data element, and at least one data source assurance indicator at a distributed database device within a distributed network of databases, where the at least one data source assurance indicator comprises a request to encrypt the data element received in the received query for authentication of distributed database devices that process the database query;
   encrypting the data element received in the received query based upon the at least one data source assurance indicator;
   forming a data portion of a local query response to the database query comprising data retrieved from a local physical database table mapped by a local logical database table that matches the received logical database table identifier;
   adding a distributed database device node identifier and the encrypted data element as an authentication portion of the local query response to authenticate the data portion of the local query response; and
   responding to the database query with at least the authenticated local query response.

2. The method of claim 1, where encrypting the data element received in the received query based upon the at least one data source assurance indicator comprises encrypting the data element received in the received query using a private encryption key paired with a public encryption key stored at a distributed database device that originated the database query.

3. The method of claim 1, where the at least one data source assurance indicator comprises an instruction to encrypt a selected data column of the data portion of the authenticated local query response.

4. The method of claim 1, further comprising determining to encrypt a selected data column of the data portion of the authenticated local query response and encrypting the selected data column.

5. The method of claim 4, further comprising adding a column identifier to the authenticated local query response identifying the selected encrypted data column.

6. The method of claim 1, where adding the distributed database device node identifier and the encrypted data element as the authentication portion of the local query response to authenticate the data portion of the local query response comprises associating the distributed database device node identifier and the encrypted data element with a hidden result column of the authenticated local query response.

7. The method of claim 1, further comprising:
   forwarding the database query comprising the logical database table identifier, the data element, and the at least one data source assurance indicator to at least one additional distributed database device within the distributed network of databases;
   receiving at least one distributed query response comprising a distributed database device node identifier and an additional encrypted data element associated with data returned from each distributed database device that processed the database query; and
   determining authenticity of each distributed database device that processed the database query based upon the additional encrypted data element and the distributed database device node identifier associated with each distributed database device that processed the database query.

8. The method of claim 7, where determining the authenticity of each distributed database device that processed the database query comprises selecting a public encryption key using the associated distributed database device node identifier for each distributed database device that processed the database query and decrypting the associated additional encrypted data element using the selected public encryption key for each distributed database device that processed the database query.

9. The method of claim 8, where determining the authenticity of each distributed database device that processed the database query comprises determining whether the decrypted additional data element associated with each distributed database device that processed the database query matches the data element forwarded with the database query to each distributed database device that processed the database query.

10. The method of claim 7, further comprising:
    processing the data returned from each distributed database device in association with the at least one distributed query response based upon the determined authenticity of each distributed database device that processed the database query; and
    invalidating the data returned from at least one of the distributed database devices that processed the database query based upon a determination that the at least one of the distributed database devices is not authenticated; and
    where responding to the database query with at least the authenticated local query response comprises:
    combining the received distributed query response associated with each distributed database device that is determined to be authenticated with the authenticated local query response; and
    responding to the database query with the combined response.

11. A system, comprising:
a memory adapted to store query authentication information and database device node identifiers; and
a processor programmed to:
receive a database query comprising a logical database table identifier, a data element, and at least one data source assurance indicator at a distributed database device within a distributed network of databases, where the at least one data source assurance indicator comprises a request to encrypt the data element received in the received query for authentication of distributed database devices that process the database query;
encrypt the data element received in the received query based upon the at least one data source assurance indicator;
form a data portion of a local query response to the database query comprising data retrieved from a local physical database table mapped by a local logical database table that matches the received logical database table identifier;
add a distributed database device node identifier and the encrypted data element as an authentication portion of the local query response to authenticate the data portion of the local query response;
store the authenticated local query response to the memory; and
respond to the database query with at least the authenticated local query response.

12. The system of claim 11, where, in being programmed to encrypt the data element received in the received query based upon the at least one data source assurance indicator, the processor is programmed to encrypt the data element received in the received query using a private encryption key paired with a public encryption key stored at a distributed database device that originated the database query.

13. The system of claim 11, where the at least one data source assurance indicator comprises an instruction to encrypt a selected data column of the data portion of the authenticated local query response.

14. The system of claim 11, where the processor is further programmed to determine to encrypt a selected data column of the data portion of the authenticated local query response and encrypt the selected data column.

15. The system of claim 14, where the processor is further programmed to add a column identifier to the authenticated local query response identifying the selected encrypted data column.

16. The system of claim 11, where, in being programmed to add the distributed database device node identifier and the encrypted data element as the authentication portion of the local query response to authenticate the data portion of the local query response, the processor is programmed to associate the distributed database device node identifier and the encrypted data element with a hidden result column of the authenticated local query response.

17. The system of claim 11, where the processor is further programmed to:
forward the database query comprising the logical database table identifier, the data element, and the at least one data source assurance indicator to at least one additional distributed database device within the distributed network of databases;
receive at least one distributed query response comprising a distributed database device node identifier and an additional encrypted data element associated with data returned from each distributed database device that processed the database query; and
determine authenticity of each distributed database device that processed the database query based upon the additional encrypted data element and the distributed database device node identifier associated with each distributed database device that processed the database query.

18. The system of claim 17, where, in being programmed to determine the authenticity of each distributed database device that processed the database query, the processor is programmed to:
select a public encryption key using the associated distributed database device node identifier for each distributed database device that processed the database query and decrypt the associated additional encrypted data element using the selected public encryption key for each distributed database device that processed the database query; and
determine whether the decrypted additional data element associated with each distributed database device that processed the database query matches the data element forwarded with the database query to each distributed database device that processed the database query.

19. The system of claim 17, where the processor is further programmed to:
process the data returned from each distributed database device in association with the at least one distributed query response based upon the determined authenticity of each distributed database device that processed the database query;
invalidate the data returned from at least one of the distributed database devices that processed the database query based upon a determination that the at least one of the distributed database devices is not authenticated; and
where, in being programmed to respond to the database query with at least the authenticated local query response, the processor is programmed to:
combine the received distributed query response associated with each distributed database device that is determined to be authenticated with the authenticated local query response;
store the combined response to the memory; and
respond to the database query with the combined response.

20. A system, comprising:
a memory adapted to store query authentication information and distributed database device node identifiers; and
a processor programmed to:
receive a database query comprising a logical database table identifier, a data element, and at least one data source assurance indicator at a distributed database device within a distributed network of databases, where the at least one data source assurance indicator comprises a request to encrypt the data element received in the received query for authentication of distributed database devices that process the database query;
encrypt the data element received in the received query based upon the at least one data source assurance indicator using a private encryption key paired with a public encryption key stored at a distributed database device that originated the database query;
form a data portion of a local query response to the database query comprising data retrieved from a local physical database table mapped by a local logical database table that matches the received logical database table identifier;

add a distributed database device node identifier and the encrypted data element as an authentication portion of the local query response to authenticate the data portion of the local query response;
associate the distributed database device node identifier and the encrypted data element with a hidden result column of the authenticated local query response;
store the authenticated local query response to the memory;
determine to encrypt a selected data column of the data portion of the authenticated local query response;
encrypt the selected data column;
add a column identifier to the authenticated local query response identifying the selected encrypted data column; and
respond to the database query with at least the authenticated local query response.

21. An apparatus, comprising:
means for receiving a database query comprising a logical database table identifier, a data element, and at least one data source assurance indicator at a distributed database device within a distributed network of databases, where the at least one data source assurance indicator comprises a request to encrypt the data element received in the received query for authentication of distributed database devices that process the database query;
means for encrypting the data element received in the received query based upon the at least one data source assurance indicator;
means for forming a data portion of a local query response to the database query comprising data retrieved from a local physical database table mapped by a local logical database table that matches the received logical database table identifier;
means for adding a distributed database device node identifier and the encrypted data element as an authentication portion of the local query response to authenticate the data portion of the local query response; and
means for responding to the database query with at least the authenticated local query response.

* * * * *